(12) United States Patent  
Gulia

(10) Patent No.: US 6,558,286 B1  
(45) Date of Patent: May 6, 2003

(54) CONTINUOUSLY VARIABLE TRANSMISSION AND VARIANTS

(75) Inventor: Nurbei Vladimirovich Gulia, kv. 146, d.3, ul. Masterkova, Moscow, 109280 (RU)

(73) Assignees: Martin Ferenc, Budapest (HU); Nurbei Vladimirovich Gulia, Moscow (RU); PlanBau Energiesysteme GmbH & Co. KG, Zerbct (DE)

( * ) Notice: Subject to any disclaimer, the term of this patent is extended or adjusted under 35 U.S.C. 154(b) by 0 days.

(21) Appl. No.: 10/031,211

(22) PCT Filed: May 14, 1999

(86) PCT No.: PCT/RU99/00162

§ 371 (c)(1),
(2), (4) Date: Jan. 11, 2002

(87) PCT Pub. No.: WO00/70241

PCT Pub. Date: Nov. 23, 2000

(51) Int. Cl.⁷ .................. F16H 37/02; F16H 13/10; F16H 15/38; F16H 15/04

(52) U.S. Cl. .................. 475/214; 475/185; 476/48; 476/45

(58) Field of Search .................. 475/214, 217, 475/185, 343, 186; 476/48, 49, 45, 54

(56) References Cited

U.S. PATENT DOCUMENTS

| | | | | |
|---|---|---|---|---|
| 2,849,885 A | * | 9/1958 | Beier | 476/5 |
| 2,939,345 A | * | 6/1960 | Burns | 475/185 |
| 3,006,206 A | * | 10/1961 | Kelley et al. | 476/2 |
| 3,181,381 A | * | 5/1965 | Jorgensen | 475/214 |
| 3,216,283 A | * | 11/1965 | General | 475/66 |
| 3,530,732 A | * | 9/1970 | Kashihara | 476/49 |
| 3,765,257 A | * | 10/1973 | Ogino | 476/48 |
| 3,990,328 A | * | 11/1976 | Galbraith | 475/185 |

FOREIGN PATENT DOCUMENTS

| | | |
|---|---|---|
| DE | 3600627 | 6/1987 |
| EP | 0459234 | 12/1991 |
| GB | 1384679 | 2/1975 |
| RU | 2091637 | 9/1997 |
| RU | 2091638 | 9/1997 |
| RU | 2138710 | 9/1999 |
| RU | 2140028 | 10/1999 |
| WO | 81/03367 | 11/1981 |

* cited by examiner

Primary Examiner—Sherry Estremsky  
Assistant Examiner—Tisha D. Lewis  
(74) Attorney, Agent, or Firm—Dellett and Walters

(57) ABSTRACT

The present invention pertains to the field of machine-tooling and essentially relates to a continuously variable transmission that comprises a central shaft (1), an epicycle (5) having outer central discs (4) attached thereon, solar wheels in the form of inner central discs (2), a carrier (6), a plurality of intermediate friction discs (3) mounted in the support (6) using axes (7) as well as rotating levers (12) and a mechanism for the combined modification of the transmission ratio and of the pressure. The latter includes power members applying an axial action (11) which are arranged on the end sides of all the above-mentioned central friction discs (2, 4), or else members pressing on the rotating levers as well as power members applying an axial action which are arranged on the outer side of the central friction discs so as to ensure contact in predetermined annular areas. The average axial rigidity of the power members applying an axial action and brought into contact with the central outer friction discs is, in terms of absolute value, higher than the average rigidity of the power members applying an axial action and brought into contact with the central inner friction discs (2).

16 Claims, 3 Drawing Sheets

US 6,558,286 B1

CONTINUOUSLY VARIABLE TRANSMISSION AND VARIANTS

FIELD OF INVENTION

The present invention relates to the field of machine-building and, in particular, to a continuously variable transmission and may be used in various fields of technology in cases where it is necessary to ensure continuously variable torque transmission while adjusting the transmission ratio depending on a load at the transmission output. It may be used, in particular, for means of transportation and variable-speed drive units.

PRIOR ART

At present, continuously variable transmissions made on the basis of a friction variable-speed drive are of wide use.

Known in the art is a planetary friction variable-speed drive comprising the outer central friction discs and the intermediate conical friction discs as well as the pressure members that apply an axial action to the central friction discs and the intermediate conical discs arranged therebetween, a radial movement of the intermediate discs and associated change in the transmission ratio of the variable-speed drive taking place due to applying an axial action to the said discs. Thus, the pressure members are at the same time mechanisms changing the transmission ratio. GB Patent 1384679, IPC[6] F16H 15/50, 1975.

The closest to the claimed solution under the first variant as to the technical substance and achieved result is a continuously variable transmission comprising a planetary friction variable-speed drive consisting of the inner and outer central friction discs laterally embracing the intermediate friction discs, a mechanism for combined modification of the transmission ratio and of the pressure made in the form of rotating levers carrying the intermediate friction discs and arranged on the planetary variable-speed drive carrier with the possibility of changing the position of the rotating levers. Patent RF 2091638 IPC[6] F16H 15/52, 1997 (the prototype). In the known solution the mechanisms for combined modification of the transmission ratio and of the pressure press the central friction discs to the intermediate discs with forces proportional to transmitted torques, subject to pre-pressing by springs.

The prototype transmission has several inherent deficiencies, namely:

the pressure members of the mechanism for combined modification of the transmission ratio and pressure are complex, and, what is most important, they do not solve the task of optimal pressing the discs to each other due to the fact that the friction coefficient at the points of the friction oil contact is varied greatly; according to the results of the study performed by the author the value of this coefficient for the central inner friction discs is varied in the range from 0.015 to 0.03 and for outer ones from 0.02 to 0.08; therefore the pressure, which is proportional to the torque only, does not achieve the required result in the planetary systems;

the systems of pressure members of the said mechanisms, including automatic adjustment with pre-pressing by a spring with a force that is usually corresponds to 25–35% of the maximum force, also do not achieve the required result; there the initial working adjustment for an outer central friction disc should be app. 5–7% of the maximum force, and even that, the most complex, combined system creates the pressure 5 times greater than the necessary one and leads to a sharp reduction in the efficiency, but for a car transmission this working mode is most widely used, especially when moving along a road (at the highest transmission);

the friction coefficient depends heavily on the rotation speed of the variable-speed drive shafts, and the above pressure members system do not enable to correct it.

The closest to the claimed solution under the second variant as to the technical substance and achieved result is a continuously variable transmission comprising a planetary friction variable-speed drive consisting of the inner and outer central friction discs laterally embracing the intermediate friction discs, a mechanism for combined modification of the transmission ratio and of the pressure made in the form of rotating levers carrying the intermediate friction discs and arranged on the planetary variable-speed drive carrier with the possibility of changing the position of the rotating levers by pushers moved along guides. Patent RF 2091637 IPC[6] F16H 15/52, 1997 (the prototype).

A specific feature of the invention according to the prototype is that the pushers are spring-loaded to the guides by centrifugal forces created due to the unbalanced state of the rotating levers relative to their rotation. Such implementation creates very inconvenient conditions of loading the pushers, resulting in inaccuracy and low reliability of regulation. For example, given the rotation speed of a low-speed shaft is changed tenfold (this is the real range of a variable-speed drive transmission-ratio variation), the centrifugal force varies hundredfold, the torque "exerting a counter-action" to that force in the regulation system varies approximately tenfold, and the maximum torque, which on a low-speed shaft corresponds to the minimum rotation speed, will just correspond to the minimum centrifugal force. Practical studies have showed that such a system does not ensure the necessary accuracy of the transmission-ratio regulation.

DESCRIPTION OF THE INVENTION

The objective of this invention is to create a continuously variable transmission on the basis of a variable-speed friction disc drive having a higher efficiency, durability, reliability and convenient in operation due to simplifying the design of the mechanism for combined modification of the transmission ratio and pressure, ensuring compliance of the friction discs pressure force in different operation modes with the transmission ratio value as well as due to dependence of the variable-speed drive transmission ratio on the output shaft load.

According to the first variant, in order to achieve the said technical result in a known continuously variable transmission comprising a planetary friction variable-speed drive consisting of the inner and outer central friction discs laterally embracing the intermediate friction discs, a mechanism for combined modification of the transmission ratio and of the pressure made in the form of rotating levers carrying the intermediate friction discs and arranged on the planetary variable-speed drive carrier with the possibility of changing their position, the mechanism for combined modification of the transmission ratio and of the pressure is provided with power members applying an axial action, which are arranged on the end sides of the inner and outer central friction discs so as to ensure their contact in the annular areas opposite to the annular areas of contact between the inner and outer central friction discs and the intermediate friction discs, an average axial rigidity of the power members applying an axial action, which are brought into contact with the outer central friction discs, is made so as to be higher, in terms of absolute value, than an average axial rigidity of the power members applying an axial action, which are brought into contact with the inner central friction discs.

Some other embodiments of the first variant of this invention are possible, according to which it is advisable that:

a mechanism for combined modification of the transmission ratio and the pressure would be provided with support members arranged on the central shaft and on the epicycle on the rear side of the power members applying an axial action and made with the stops contacting the power members applying an axial action with the possibility of varying their axial rigidity both in magnitude and in negative/positive value;

each power member applying an axial action, as included in the mechanism for combined modification of the transmission ratio and the pressure, would be made in the form of a chamber communicating with the pressurized working medium and arranged on an epicycle with the possibility of pressing of, at least, one outer central friction disc to the respective intermediate friction discs depending on the working medium pressure in the said chamber;

each power member applying an axial action would be made in the form of an annular conical surface made on a power member arranged on the central shaft and on an annular conical surface facing it and made on an inner central friction disc, between the said annular conical surfaces weights being arranged with the possibility of their radial movement along a conical gap formed by the said annular conical surfaces and with the possibility of varying the value of pressing the inner central friction discs to the intermediate friction discs;

the said weights would be made in the form of shaped spring rings with alternating radial slots.

The said features are essential and interrelated therebetween by cause-effect relation with the formation of a totality of essential features sufficient for achieving the technical result.

This is ensured by the fact that the central friction discs, both the inner and the outer ones, are pressed to the intermediate friction discs by the power members applying an axial action, in particular by springs made in the form of well-known plate or cantilever beam discs arranged on either side of the intermediate friction discs both on the outer and the inner central friction discs. The said springs interact with the said discs on the back surfaces at the radii that are closer to the races than to the disc bases.

The inner and outer central friction discs themselves may serve as such springs, in such a case the average, over the total travel, rigidity value of the springs of the outer central friction discs in terms of absolute value (since such value may be varied from positive values to zero and further to negative values) is higher than the similar parameter of the springs of the inner central friction discs. The rigidity of the springs of the outer or inner central friction discs may be varied in their travel smoothly or discretely, and the said springs may contact by their face or back surfaces with the stops or other springs with the possibility of varying the rigidity of the first springs of the inner and outer central friction discs. In order to correct the force of pressing the inner and outer central friction discs to the intermediate friction discs, the continuously variable transmission is provided with pressure adjusters acting according to the rotation speed and made in one variant of this invention in the form of weights arranged between the annular conical surfaces made on the support members and on the inner central friction discs and installed with the possibility of increasing the pressure force while the rotation speed is increased, as well as in the form of chambers for supplying the pressurized working medium (e.g., gas or liquid), which also increases the pressure force, maintaining it at a required level.

Thus, the optimal, as to the efficiency, pressing the outer and inner central friction discs to the intermediate friction discs is ensured, which is conditioned, e.g., by the fact that the torque, in particular that developed by car engines in the full fueling mode without enrichment (the most economical mode in which a continuously variable transmission should work), is close to a constant value, and the torque on the carrier of a variable-speed drive (output torque) depends on the variable-speed drive transmission ratio that is rather accurately related to the radial movement of the axle of the intermediate friction discs, and, therefore, to the axial travel of the spring. Thus, each movement of the intermediate friction discs corresponds, due to a certain change in the spring position, a well-defined optimal pressure force slightly distorted by a change in the rotation speed. Such a change, which results in some insignificant change of the friction coefficient, may be corrected with the adjusters introduced into the continuously variable transmission, such adjusters having centrifugal weights or pressure chambers creating an additional pressure force.

The engine of a transportation vehicle works under low fueling, according to modern methods of automatic control of the car power unit with the known continuously variable transmission, only at the start and at low movement speeds. In those modes the variable-speed drive efficiency, according to calculations and experiments, is reduced not more than by 1–3% due to a non-optimal pressure force (overpressure), which is not likely to be noticed compared to a far more noticeable reduction in the engine efficiency under low fueling. The efficiency of the claimed continuously variable transmission with the proposed system of exerting elastic pressure on the friction discs is most applicable for variable-speed drives according to the given system and reaches 0.96–0.97 at the highest transmission ratios of 1.2–1.3.

According to the second variant, in order to achieve the said technical result in the known continuously variable transmission comprising a planetary friction variable-speed drive consisting of the inner and outer central friction discs laterally embracing the intermediate friction discs, a mechanism for combined modification of the transmission ratio and of the pressure made in the form of rotating levers carrying the intermediate friction discs and arranged on the planetary variable-speed drive carrier with the possibility of changing their position, a mechanism for combined modification of the transmission ratio and of the pressure is provided with pushers arranged with the possibility of moving along the guides, members applying pressure to the rotating levers and power members applying an axial action arranged on the face sides of the inner and outer central friction discs so as to ensure their contact in the annular areas opposite to the annular areas of contact between the inner and outer central friction discs and the intermediate friction discs, an average axial rigidity of the power members applying an axial action, which are brought into contact with the outer central friction discs, is made so as to be higher, in terms of absolute value, than an average axial rigidity of the power members applying an axial action, which are brought into contact with the inner central friction discs, and the said pressure members being connected to the rotating levers with the possibility of ensuring the rotation of the said levers to the side corresponding to the reduction in the transmission ratio from the central shaft to the low-speed shaft.

Some other embodiments of the second variant of this invention are possible, according to which it is advisable that:

- the transmission would be provided with a driven mechanism connecting the carrier with the low-speed shaft and made, in particular, as a driven jaw clutch;
- the guides would be made as helical profiled surfaces, which direction would ensure, if the carrier advances the low-speed shaft in case of making the central shaft the driving one and making the low-speed shaft the driven one, an angular movement of the rotating levers to the side corresponding to an increase of the transmission ratio;
- the pressure members of the rotating levers would be made as, at least, one spring connected on one its end to the carrier and on the other end to the low-speed shaft;
- the pressure members of the rotating levers would be made as, at least, one spring connected on one its end to the low-speed shaft and on the other end to the rotating levers having the capacity of moving angularly with respect to the carrier;
- the pressure members of the rotating levers would be made as, at least, one spring connected on one its end to the carrier and on the other end to the rotating levers having the capacity of moving angularly with respect to the carrier;
- the rotating levers would be made imbalanced, their center of gravity would be displaced from their axles of rotation to a side according to which its movement from the center to the periphery results in a reduction in the variable-speed drive transmission ratio;
- the pressure member would be made with the possibility of regulating the dependence of the force magnitude on movement, e.g., as power hydraulic or pneumatic cylinders;
- the profiled surfaces would be made with the profile varying in the axial direction and would be arranged with the possibility of their axial movement with respect to the pushers;
- the profiled surfaces and the pushers may be arranged both at the rotating levers and at certain parts of the mechanism for modification of the transmission ratio and the pressure, which are connected to the low-speed shaft.

The said features are essential and interrelated therebetween by cause-effect relation with the formation of a totality of essential features sufficient for achieving the technical result.

Namely, in a case the mechanism for modification of the transmission ratio and the pressure comprises the pressure members of the rotating levers (e.g., springs, hydraulic cylinders or pneumatic cylinders, etc.), it ensures their pressing to the direction of turning that corresponds to a decrease in the transmission ratio from the central shaft to the low-speed shaft, the pushers and the guides profiled surfaces may be arranged both at the rotating levers and at the member connected to the low-speed shaft; the said profiled surfaces are made helical in the direction that ensures, if the carrier advances the low-speed shaft in case of making the central shaft the driving one and making the low-speed shaft the driven one, an angular movement of the rotating levers to the side corresponding to an increase of the variable-speed drive transmission ratio; the profiled surfaces may be made varying (non-flat) in the axial direction with the possibility of their angular movement with respect to the pushers; the center of gravity of the rotating levers either may be at the axle of their rotation (the levers are balanced) or may be displaced to the side according to that its movement from the center to the periphery results in a decrease in the variable-speed drive transmission ratio; if necessary the mechanism for modification of the transmission ratio and the pressure may be fixed while the variable-speed drive transmission ratio is maintained constant. In such a case both the said central shaft and the low-speed shaft may be either driving or driven, respectively.

Figure 1:
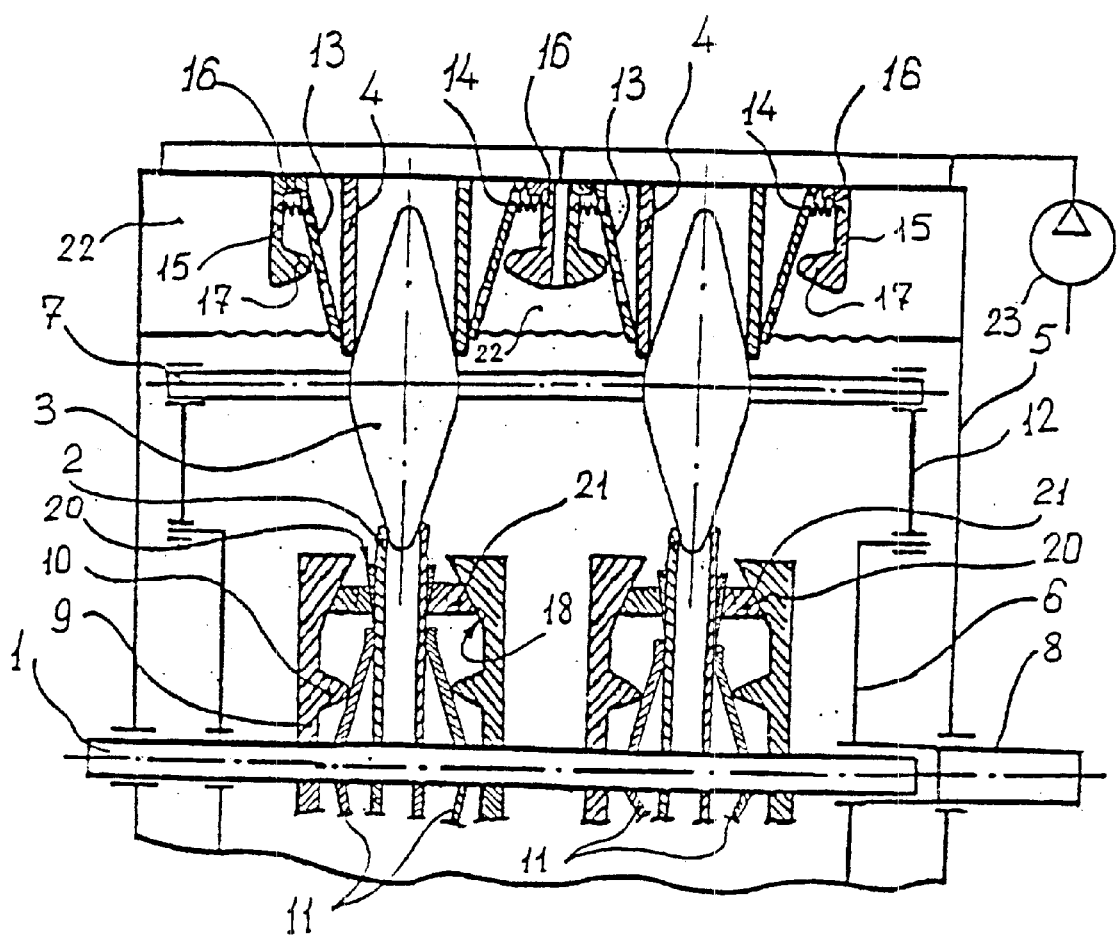
FIG. 1 is a general diagram of the continuously variable transmission (Variant 1).

The continuously variable transmission comprises the central shaft 1 (FIGS. 1, 2) connected to the inner central friction discs 2 brought into contact with the intermediate friction discs 3, which are, in their turn, brought into contact with the outer central friction discs 4 attached to the epicycle 5 of the planetary variable-speed drive having, as its sun gear, the inner central friction discs 2 arranged on the central shaft 1, as well as the carrier 6. The intermediate friction discs 3 are arranged on the axle 7. To ensure the optimal pressure of the central friction discs to the intermediate discs, the mechanism for combined modification of the transmission ratio and the pressure is used.

According to the first variant of the invention (FIG. 1) the mechanism for combined modification of the transmission ratio and the pressure is made as follows.

On the central shaft 1 (FIG. 1) at both sides from the inner central friction discs 2 arranged with the possibility of axial movement the support members 9 are fixed both in the axial and in the angular directions, to the said members 9 the stops 10 are attached that are brought into contact with the power members applying an axial action that are made in the form of the plate springs 11 ensuring, depending on a movement, the positive, zero or negative rigidity. The circumference of the contact between the stops 10 and the springs 11 may have various radii depending on the required force and deformation of the springs 11, including the radius that is maximally close to the radius of the central shaft 1. The springs 11, in their turn, are brought into contact with the inner central friction discs 2 at the end that is rear relative to the contact between the inner central friction discs 2 and the intermediate friction discs 3 arranged on the axles 7 that, in their turn, are fixed in the bearings at the rotating levers 12 fixed with the possibility of rotation on the carrier 6. The springs 11, in particular, may also have their bases in contact, e.g., not in their end positions, i.e., between the two inner friction discs 2. The support members 9 and 15 between the two inner central friction discs may be made as a whole with the common rear sides.

Similarly, the outer central friction discs 4, also having the possibility of moving axially on the epicycle 5 along its inner cylindrical surface, are pressed to the intermediate friction discs 3 by the springs 13, e.g., plate ones, that are arranged with the possibility of moving axially at their bases. The springs 13 are connected at their bases by, e.g., pre-deformed members 14, e.g., tension springs, to the support members 15. The shoulders 16 are made on the support members 15 in the area of fitting on the epicycle 5 and are arranged with the possibility of contacting the springs 13. The springs 13 are fixed in the axial and the angular directions on the epicycle 5 (which is, in this case, stationary) and are in contact with the annular stops 17 made on the support members 15. An embodiment is possible wherein the support members 15 arranged between the two outer central friction discs 4 may contact each other by their rear sides or may be made as a whole. The stops 10 and 17 as well as the rear sides of the springs 11 and 13 act as the corresponding mechanical (kinematical) ties.

In one particular case the springs 11 and 13 may be made as one piece with the inner and outer central friction discs, respectively, and directly act as the inner and outer central friction discs, respectively, the inner ones 2 and the outer ones 4. In such a case races are made on those springs on the same sides as on the corresponding inner and outer central friction discs, as well as the contact areas with the corresponding mechanical (kinematical) ties.

To ensure the adjustment of the pressure force depending on the speed of rotation of the central shaft 1, the power members applying an axial action of the mechanism for combined modification of the transmission ratio and the pressure are made as follows.

Figure 4:
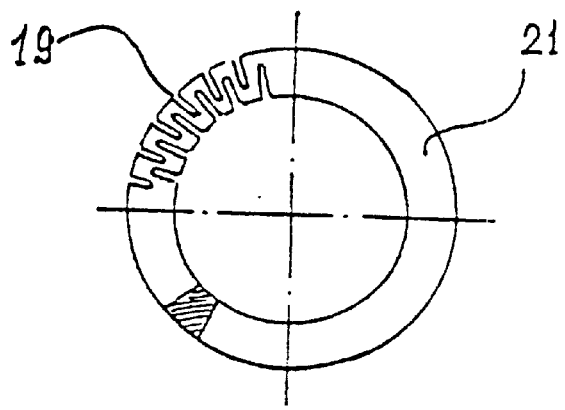
FIG. 4 represents a variant of making a weight in the form of a shaped spring ring with alternating radial slots.

In one of the variants the power members applying an axial force are made as the conical annular surfaces 18 arranged on the support members 9 and directed toward the inner central friction discs 2 having the same conical annular surfaces 20, in such a case between the inner and outer friction discs 2 and the support members 9 the weights 21 are arranged with the possibility of their radial movement in the conical gap formed by the said surfaces 18 and 20 alongside with a radial movement of the intermediate friction discs 3. FIG. 4 represents an embodiment of the weight 21 in the form of a shaped spring ring with alternating radial slots 19 ensuring compliance of the springs in the circumferential and radial directions. The said conical gap may be also formed by the two conical annular surfaces 20 on the rear sides, as facing each other, of the inner friction discs 2.

In another variant the power member applying an axial action is made as the chamber 22 communicating with the source 23 of the pressurized working medium and arranged on the epicycle 5 with the possibility of pressing at least one outer central friction disc 4 to the corresponding intermediate friction discs 3 with a force defined by the value of the working medium pressure in the chamber 22.

The chamber 22 may be made with bellows (FIGS. 1, 2), the plate springs 13—with holes for free passing of the pressurized working medium to the outer central friction discs 4.

According to the second variant (FIGS. 2, 3) of this invention the mechanism for combined modification of the transmission ratio and the pressure is made as follows.

The axles 7 (FIG. 2) carrying the intermediate friction discs 3 are arranged through bearings on the rotating levers 12 connected to the carrier 6 of the planetary variable-speed drive and carrying on the sides opposite to the intermediate friction 3 the counterbalances 24 serving for balancing (partial or full) the rotating levers 12 and pushers 25 made, e.g., as rollers serving as the counterbalances and contacting the guides made as the shaped surfaces 26 on the disc 27 arranged on the low-speed shaft 8.

The low-speed shaft 8 is connected to the carrier 6 of the variable-speed drive through a controlled mechanism, in particular, the controlled jaw clutch, one part 28 of which is arranged on the low-speed shaft 8 or on the disc 27 and the other part of the clutch is arranged on the carrier 6.

Figure 2:
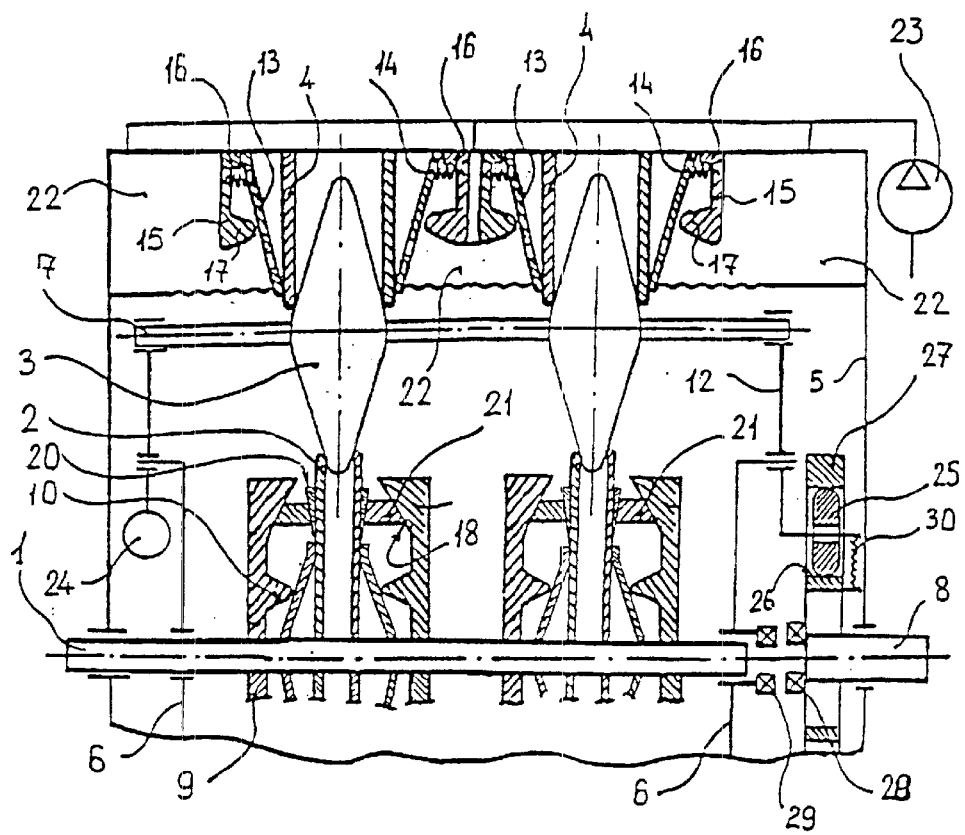
FIG. 2 is a general diagram of the continuously variable transmission (Variant 2).

In FIGS. 1 and 2 the intermediate friction discs 3, the axles 7 with the bearings, the rotating levers 9 with the counterbalances 24 and the pushers 25, as well as the guides are represented, for the sake of simplicity, in the singular; but there may be several of them, e.g., six, which are arranged on the circumference with equal spaces therebetween.

Figure 3:
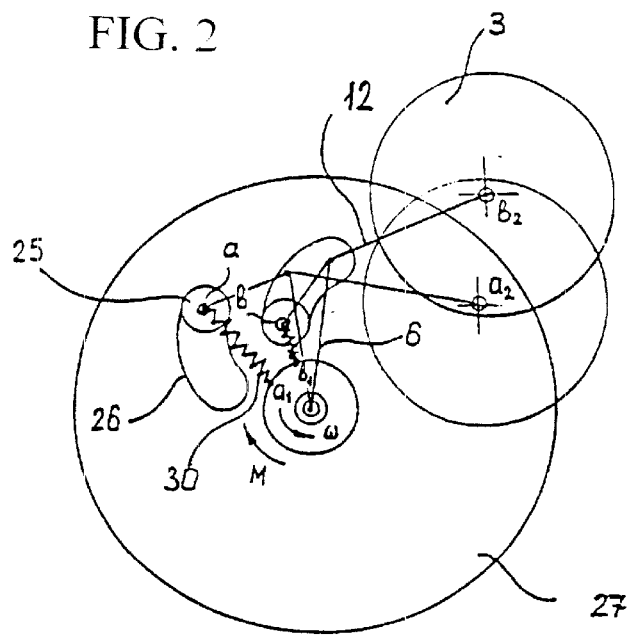
FIG. 3 shows the arrangement of the pushers and the guides in the positions (a) and (b).

The disc 27 is arranged on the low-speed shaft 8 with the possibility of rotating relative to the carrier 6, the pusher 25 is connected through the spring 30, in this case this is a compression spring, to the carrier 6 or the disc 27 (as shown in FIG. 3); thus the pusher 25 is spring-loaded to the side of angular movement of the rotating lever 12, corresponding to movement of the intermediate friction discs 3 toward the center, which results in a decrease in the variable-speed drive transmission ratio. Thus, when the pusher 25 moves under the action of the spring 30 from the position (b) to the position (a) (FIG. 3), i.e., outwards, the end of the spring 30, which is connected to the disc 27, also moves from the position ($b_1$) to the position ($a_1$), and the intermediate discs 3 move from the position ($b_2$) to the position ($a_2$), i.e., toward the center (FIG. 3). Owing to this the transmission ratio from the central shaft 1 to the low-speed shaft 8 decreases.

The pushers 25 may be also attached to the opposite side of the rotating lever 12. Then the tension springs 30 should, as it were, draw the pushers 25 toward the central shaft 1, which also results in a decrease in the transmission ratio. Sometimes, it is convenient to use, instead of the springs 30, pneumatic or hydraulic cylinders connected, similarly to the springs 30, to certain parts of the mechanism for modification of the transmission ratio and the pressure. In such cylinders the pressurized working medium is supplied according to any known method, e.g., from a receiver through a manifold (not shown in the Figures), with the pressure adjustment.

In all the above cases it is supposed that the carrier 6 rotates in the direction of the arrow "w", and the moment of resistance acts on the low-speed shaft 8, and, consequently, on the disc 27 in the direction of the arrow "M" (FIG. 3).

A similar process occurs when torsion springs are used (not shown in the Figures) instead of the springs 30; such a spring should rotate the disc 27 relative to the carrier 6 in the direction opposite to that of the arrow "M".

The profiled surfaces 26 (FIG. 3) are made helical, therefore, when the disc 27 is forced to rotate in the direction opposite to that of the arrow "M" with the carrier 6 stopped, in all cases the pushers 25 are moved in the direction resulting in an angular movement of the rotating levers 12, what, like in the previous cases, reduces the transmission ratio. It is easy to note that deceleration of the low-speed shaft 8 and the disc 27, when the central shaft 1 and, consequently, the carrier 6 are rotating in the direction opposite to that of the arrow "M" (in the direction of the arrow "w") (FIG. 3), results in advancing the low-speed shaft and the disc 27 by the carrier 6, what, as in a case of loading the low-speed shaft 8 with the working torque, results in an increase of the variable-speed drive transmission ratio and decrease in the speed of the transportation means.

It should be noted that sometimes, proceeding from the arrangement conditions, it would be convenient to interchange the profiled surfaces and the pushers and to attach the pushers to the member connected to the low-speed shaft 8, e.g., to the disc 27, and to make the profiled surfaces 26 on the rotating shafts 12, e.g., on the counterbalances 24. But, the above-cited rule of action of forces and torques of the pressure members in different cases and the modification of the variable-speed drive transmission ratio, as associated therewith, remains unchanged.

The profiled surfaces 26 may be made either helical flat or volumetric, i.e. with a profile varying along the axial direction, in order to ensure the possibility of moving the pushers 25 along them in the axial direction, i.e., with the variable-speed drive transmission ratio adjusted thereby.

In order to maintain the variable-speed drive transmission ratio constant, it is necessary to lock the carrier 6 to the low-speed shaft 8, i.e., to lock the transmission ratio modification controller. For this purpose it is necessary to include the controlled clutch 28–29, thereby connecting the carrier 6 to the low-speed shaft 8. The clutch 28 –29 may be controlled manually or remotely, e.g., with a solenoid drive.

PREFERRED EMBODIMENT OF INVENTION

At the minimum variable-speed drive transmission ratio that in respect of, e.g., a car is 1.2–1.3, the intermediate friction discs 3, as arranged at the axles 7, are in their central position (the lowest position in FIG. 1). The deformation of the plate compression springs 11 is the greatest due to the maximal axial separation of the inner central friction discs 2 under the holding-apart action of the intermediate friction discs 3 brought in contact in this position at their maximum thickness with the inner central friction discs 2 and due to the contact of the springs 11 with the ties—stops 10 at the support members 9. It is known that plate springs, with their small thickness and high deformation values, have negative rigidity, and this parameter depends on the size of the spring 11 and on the position of the stops 10. The dependence of the rigidity of the springs 11 on their size and axial deformations is described, e.g., in the book by Birger et al. Strength Analysis of Machine Parts, Moscow, Mashinostroyenie. 1979, pp. 171–172.

The required pressure of the springs 11 in this position is low due to a high value of the friction coefficient conditioned by high pressures and a small thickness of the oil film at an almost constant torque, which is ensured by the specification of the springs 11. At the outer central friction discs 4, where their separation is small due to the small thickness of the intermediate friction discs 3, the deformation of the spring 19 is not large, the stops 17 do not touch the springs 13 yet, and the pressure force at this point of contact, when transmission ratios are the lowest, is minimal, in spite of a low value of the friction coefficient. This is depicted in the plot represented in FIG. 5, the left side. (On the abscissa axis the axial movement in the direction of the arrow increases for the outer springs 13 and decreases for the inner springs 11.)

When the axles 7 and the intermediate friction discs 3 are moved to the periphery (up in FIG. 1) the transmission ratio increases, the deformation of the springs 11 decreases, the friction coefficient on the inner central friction discs 2 becomes lower due to lowering of the contact stresses and thickening of the oil film, what requires to increase the pressure of the springs 11, and this is ensured by their characteristics. Due to an increase in the deformation of the springs 13, they are brought into contact with the stops 17 and, while in contact, increase their rigidity, what progressively increases their pressure on the outer central friction discs 4. Such a pressure is just necessary in the mechanism due to increase of the transmission ratio and an associated increase in the torque at the epicycle 5, i.e., at the outer central friction discs also, though the friction coefficient increases at that point of contact. The required pressure in ensured by the parameters of the springs 13 and the stops 17 (see the above-cited publication, pp. 462–473); this is depicted in the plot represented in FIG. 2, the middle part.

At the maximum transmission ratio, i.e. in the peripheral position (the upper position in FIG. 1) of the intermediate friction discs 3 (FIG. 3) and the axles 7 the friction coefficient on the outer central friction discs 4 is at the maximum, and the required torque at the low-speed 8 is usually limited, e.g., due to wheel-spin. Therefore, the required pressure force of the springs 13 is limited, what is just ensured by pre-deformed members 14 (e.g., by rigid tension springs, etc.), which do not allow the pressure force to exceed a definite value due to the detachment of the bases of the springs 13 from the shoulders 16 of the support members 15, earlier pressed to each other by the tie of this group of resilient power members—the springs 14.

Figure 5:
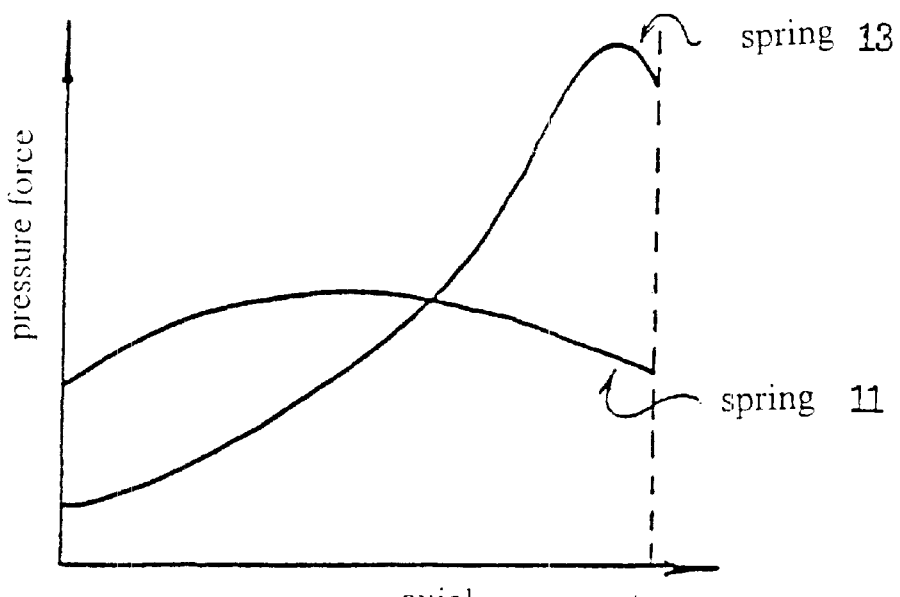
FIG. 5 is a plot showing the dependence of a force exerted by the power members made as disc springs on their axial movement (Variants 1 and 2).

At the contact of the inner friction discs 2 with the intermediate friction discs 3, due to further lowering of the friction coefficient and mainly due to lowering of the required torque, e.g., in wheel-slip, the need in an increased pressure force is reduced, what is ensured by the springs 11 having small deformation in the area of positive rigidity (FIG. 5, the right side of the plot).

Thus, the required pressure at the points of contact is ensured by the parameters of the springs and the ties as well as by modification of the variable-speed drive transmission ratio. This is the essence of the combined modification of the transmission ratio and the pressure. Also, the friction coefficients in all areas of contact at all positions decrease when the speed of rotation increases. This results in the need to increase the pressure that, at low speeds of rotation, raises to some "overpressure" and results in an insignificant reduction of the efficiency.

Therefore, both at the inner friction discs 2 and at the outer friction discs 4 pressure members may be used, which act as adjusters increasing the pressure force.

Thus, for example, when the central shaft 1 rotates at an increased speed, the weights 21 tend to go to the periphery, creating thereby an additional pressure on the inner central friction discs 2, and the form of the conical surfaces 18 and 20 as well as the weights 21 enables to attain the necessary values of the pressure force, depending on the speed of rotation and the radial movement of the weights 21. The radial movement of the weights 21 is eased by their compliance in the circumferential and the radial directions due to the availability of the slots 19.

The outer, connected to the epicycle 5, springs 13 and the support members 15 do not rotate, therefore the pressure force may be adjusted (increased) by supplying the pressurized working medium (gas, liquid) to the chambers 22 from the source 23, which is determined, e.g., by the rotational speed transducer of the central shaft 1 and the movement value of the axle 7, i.e., by the transmission ratio.

The torque from all the springs, the stops, the support members etc. is transmitted, like in similar mechanisms, to the friction discs by the friction force, since the friction coefficients of rest at friction of boundary (incomplete) lubrication are several times higher than the friction coefficient in an oil film when working surfaces are rolling; in such a case the pressure forces are equal and the radii are far less different than the friction coefficients. Also, the said friction of rest contacts are good protective members of the mechanism in cases of unexpected seizure of the variable-speed drive due to breakage of parts, entering of unlocked fastening members into the mechanism etc.

The second variant of the invention is implemented as follows. The central shaft 1 (FIGS. 2, 3) is rotated, e.g., by the engine of a transportation means at the almost constant torque. Here the mechanism of combined modification of the transmission ratio operates as follows, While the load (moment of resistance) at the low-speed shaft 8 is small, the action of the pressure members (springs, cylinders) prevails, and the rotating levers 12 are in the position corresponding to the minimum ratio of transmission from the central shaft 1 to the low-speed shaft 8. For example, when the epicycle 5 of the planetary variable-speed drive is stalled, the inner central friction discs 2 are most close to the rotation axis of the central shaft 1 and the low-speed shaft 8, the inner central friction discs 2 are brought into contact with the intermediate friction discs 3 along the small radius of the latter and the outer central friction discs 4 —along the greatest radius (the real minimum transmission ratio is about 1.2–1.3).

With an increase of the moment of resistance at the low-speed shaft 8 the pushers 25 begin, overriding the action of the static pressure members, e.g., the spring 30 (FIGS. 2, 3), moving along the profiled surfaces 26, thus shifting the rotating levers 12 to a position corresponding to the increase in the variable-speed drive transmission ratio. At the maximum moment of resistance the pushers 25 come to the end of the profiled surfaces 26, and the pressure power member, in particular the spring 30, is deformed completely. The intermediate friction discs 3 are in the position, which is at the maximum distance from the central shaft 1, and this corresponds, when the epicycle 5 is stalled, to the maximum transmission ratio of the variable-speed drive (the real maximum transmission ratio is from 6 to 11). It should be noted that if the central shaft 1 is decelerated and the rotational action of the engine is transmitted to the epicycle 5, which is allowed according to the planetary systems, the above-stated principle of action of the mechanism for modification of the transmission ratio and the pressure remains the same, with the exception that the intermediate friction discs 3 at the maximum transmission ratio are brought close to the central shaft and at the minimum one are brought to the maximum distance therefrom, i.e., their position is inverse to that described above.

When the moment of resistance decreases, the process inverse to that described above occurs at the low-speed shaft 8, and the variable-speed drive transmission ratio reduces again. Thus, the "rigid" characteristic of the engine of a transportation means become "soft" that is typical, e.g., for a DC motor with series excitation or combined excitation, or for a drive with a torque converter.

When the profiled surfaces 26 are volumetric and the pushers 25 move axially relative to them, the mechanical characteristic at the low-speed shaft 8 becomes adjustable by axial movement of the pushers 25 relative to the profiled surfaces 26.

In a case of using the adjustable pressure members, e.g., pneumatic cylinders instead of the tension-compression springs 30, where pressurized gas (air) is supplied under control, e.g., from a stationary receiver through a pressure regulator and a manifold ensuring the supply of pressurized gas from a stationary piping to rotating cylinders, the mechanical characteristic at the low-speed shaft 8 also becomes adjustable.

In a case where it is necessary to lock the mechanism for combined modification of the transmission ratio and the pressure as well as the value of pressing the inner 2 and the outer 4 central friction discs to the intermediate friction discs 3 in any position and, consequently, to fix the transmission ratio, the clutch 28–29, e.g., a jaw one, is engaged, interlocking the carrier 6 and the low-speed shaft 8.

In a case of partial balancing of the rotating levers 12 with the counterbalances 24 the rotation of the levers 12 due to their imbalance, when the carrier 6 rotates, should be in the same direction as under the action of the pressure member, e.g., the spring 30. Then, such partial imbalance at low transmission ratios of the variable-speed drive and, consequently, high speeds of rotation of the carrier 6 may either contribute to the action of the pressure members or, at the same forces, reduce their dimensions and weight. And, in a case of, for example, the driving central shaft 1, the center of gravity of the rotating lever 12 should be displaced toward the counterbalance 24; but in a case of the driving epicycle 5 it should be displaced toward the intermediate friction discs 3, i.e., to the side where its movement from the center to the periphery results in reducing the transmission ratio of the variable-speed drive.

INDUSTRIAL APPLICABILITY

The utilization of this invention enables to create a continuously variable transmission having a high efficiency, higher reliability and accuracy of control over regulating the transmission ratio in conditions of varying load at the low-speed shaft due to providing it with a stable loading mechanism for modification of the transmission ratio and the pressure.

What is claimed is:

1. A continuously variable transmission comprising a planetary friction variable-speed drive consisting of central inner and outer friction discs arranged, respectively, on a central shaft and on an epicycle and laterally embracing intermediate friction discs, a mechanism for combined modification of the transmission ratio and of the pressure made in the form of rotating levers carrying the intermediate friction discs and arranged on a planetary variable-speed drive carrier, which is connected to a low-speed shaft, with the possibility of changing the position of the rotating levers, characterized in that the mechanism for combined modification of the transmission ratio and of the pressure is provided with power members applying an axial action, which are arranged on end sides of all the said central friction discs so as to ensure the contact of the said members in annular areas of the central friction discs, said areas being opposite to annular areas of contact between the said friction discs and the intermediate friction discs, the average axial rigidity of the power members applying an axial action, which are brought into contact with the central outer friction discs, being made so as to be higher, in terms of absolute value, than the average rigidity of the power members applying an axial action, which are brought into contact with the central inner friction discs.

2. A transmission according to claim 1, characterized in that the mechanism for combined modification of the transmission ratio and of the pressure is provided with support members arranged on the central shaft and on the epicycle from a rear side of the power members applying an axial action and being made with stops contacting the power members applying an axial action with the possibility of varying the axial rigidity of the latter both in magnitude and in negative/positive value.

3. A transmission according to claim 1, characterized in that the power member applying an axial action is made as a chamber connected to a source of a pressurized working medium and arranged on the epicycle with the possibility of pressing at least one central outer friction disc to the respective intermediate friction discs, depending on the pressure of the working medium in the said chamber.

4. A transmission according to claim 1, characterized in that the said power member applying an axial action is made as an annular conical surface made on a support member, which is arranged on the central shaft, and directed toward the inner central friction disc with an annular conical surface made thereon, between the latter and the said annular conical surface of the support member are weights being arranged with the possibility of their radial movements along a conical gap formed between the annular conical surfaces and of variation of the force of pressing the inner central friction discs to the intermediate friction discs.

5. A transmission according to claim 1, characterized in that the power member applying an axial action is made as annular conical surfaces made on rear sides, which face each other, of the inner central friction discs, between the said annular conical surfaces are weights being arranged with the possibility of their radial movements along a conical gap and of variation of the force of pressing the inner central friction discs to the intermediate friction discs.

6. A transmission according to claim 4, characterized in that the said weights are made as shaped spring rings with alternating radial slots.

7. A continuously variable transmission comprising a planetary friction variable-speed drive consisting of inner and outer central friction discs arranged, respectively, on a central shaft and on an epicycle and laterally embracing intermediate discs, a mechanism for combined modification of the transmission ratio and of the pressure made in the form of rotating levers carrying the intermediate friction discs and arranged on a planetary variable-speed drive carrier, which is connected to a low-speed shaft, with the possibility of changing the position of the rotating levers, the mechanism for combined modification of the transmission ratio and of the pressure being made with pushers arranged with the possibility of moving along guides, characterized in that the mechanism for combined modification of the transmission ratio and of the pressure is provided with members applying pressure to the rotating levers and power members applying an axial action, which are arranged on end sides of all the said central friction discs so as to ensure their contact in annular areas of the central friction discs, said areas being opposite to annular areas of contact between the said friction discs and the intermediate friction discs, the average axial rigidity of the power members applying an axial action, which are brought into contact with the outer central friction discs, being made so as to be higher, in terms of absolute value, than the average rigidity of the power members applying an axial action, which are brought into contact with the central inner friction discs, the members applying pressure being connected to the rotating levers with the possibility of ensuring rotation of the said levers to a side corresponding to reduction in the ratio of transmission from the central shaft to the low-speed shaft.

8. A transmission according to claim 7, characterized in that it is provided with a controlled locking mechanism connected, respectively, to the carrier and the low-speed shaft.

9. A transmission according to claim 7, characterized in that the controlled locking mechanism is made as a controlled jaw clutch.

10. A transmission according to claim 7, characterized in that the guides are made as profiled surfaces arranged helically, which direction ensures, in case of making the central shaft the driving one and advancing by the carrier the low-speed shaft made the driven one, an angular movement of the rotating levers to the side corresponding to an increase in the ratio of transmission from the central shaft to the low-speed shaft.

11. A transmission according to claim 7, characterized in that the member applying pressure to the rotating levers is made as at least one spring connected on one of its end to the carrier and on its other end to the low-speed shaft, with the possibility of their angular movement relative to each other.

12. A transmission according to claim 7, characterized in that the member applying pressure to the rotating levers is made as at least one spring connected on one of its end to the low-speed shaft and on its other end to a rotating lever with the possibility of its angular movement relative to the carrier.

13. A transmission according to claim 7, characterized in that the member applying pressure to the rotating levers is made as at least one spring connected on one of its end to the carrier and on its other end to a rotating lever with the possibility of its angular movement relative to the carrier.

14. A transmission according to claim 7, characterized in that the rotating levers are made imbalanced, their center of gravity being displaced from their axes of rotation to the side in accordance to which its movement from the center to the periphery results in a decrease in the ratio of transmission from the central shaft to the low-speed shaft.

15. A transmission according to claim 7, characterized in that the member applying pressure is made with adjustable dependence of the force on movement as power cylinders connected to a source of a pressurized working medium.

16. A transmission according to claim 10, characterized in that the profiled surfaces are made with the profile varying in the axial direction and arranged with the possibility of their axial movement relative to the pushers.

* * * * *